US012803676B2

(12) United States Patent
Sharma et al.

(10) Patent No.: US 12,803,676 B2
(45) Date of Patent: Nov. 17, 2026

(54) MULTI-PHOTODETECTOR CIRCUITS AND OPTICAL RECEIVER INCORPORATING A MULTI-PHOTODETECTOR CIRCUIT

(71) Applicant: GlobalFoundries U.S. Inc., Malta, NY (US)

(72) Inventors: Prateek Kumar Sharma, Bangalore (IN); Avijit Chatterjee, West Bengal (IN); Riddhi Nandi, Bangalore (IN); Rupa Gopinath Minasamudram, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 770 days.

(21) Appl. No.: 18/307,864

(22) Filed: Apr. 27, 2023

(65) Prior Publication Data

US 2024/0364428 A1 Oct. 31, 2024

(51) Int. Cl.
*H04B 10/69* (2013.01)
*H04B 10/40* (2013.01)

(52) U.S. Cl.
CPC ......... *H04B 10/6971* (2013.01); *H04B 10/40* (2013.01); *H04B 10/691* (2013.01)

(58) Field of Classification Search
CPC ... H04B 10/6971; H04B 10/40; H04B 10/691
See application file for complete search history.

(56) References Cited

U.S. PATENT DOCUMENTS 5,001,336 A * 3/1991 de la Chapelle ...... H04B 10/50 250/208.2
5,270,532 A * 12/1993 Hietala .................... G02B 6/42 385/2

(Continued)

FOREIGN PATENT DOCUMENTS

KR 1020190059488 A 5/2019

OTHER PUBLICATIONS

Bruynsteen et al., "Integrated balanced homodyne photonic-electronic detector for beyond 20 GHz shot-noise limited measurements," Optica, vol. 8, No. 9, Sep. 2021, pp. 1146-1152.

(Continued)

*Primary Examiner* — Pranesh K Barua
(74) *Attorney, Agent, or Firm* — Ramakrishnan Parthasarathy; Hoffman Warnick LLC

(57) ABSTRACT

Disclosed are a multi-photodetector circuit and an optical receiver incorporating the circuit. The circuit includes parallel-connected photodiodes. In some embodiments, photodiodes are connected, in a same direction, between a positive power supply line and an output line. They receive equal power optical signals or a series of 1:2 optical dividers is employed so each photodiode receives a progressively lower power signal until the last two photodiodes, which receive equal power optical signals. In other embodiments, first photodiodes are connected, in one direction, between a positive power supply line and an output line and second photodiodes are connected, in an opposite direction, between a negative power supply line and the output line. First photodiodes receive equal power optical signals from an optical divider in response to an optical input signal and second photodiodes receive equal power optical signals from another optical divider in response to an inverted optical input signal.

16 Claims, 8 Drawing Sheets

(56) References Cited

U.S. PATENT DOCUMENTS

| | | | | |
|---|---|---|---|---|
| 5,404,006 | A * | 4/1995 | Schaffner | G02B 6/42 257/E31.066 |
| 7,299,029 | B2 * | 11/2007 | Elder | H03J 5/0272 455/313 |
| 2005/0207696 | A1 * | 9/2005 | Welch | G02B 6/12011 385/14 |
| 2007/0127933 | A1 * | 6/2007 | Hoshida | H04B 10/66 398/202 |
| 2011/0318015 | A1 * | 12/2011 | Sugimoto | H04B 10/6933 398/208 |
| 2014/0159183 | A1 | 6/2014 | Na | |
| 2015/0304042 | A1 * | 10/2015 | Schemmann | H01S 3/1608 398/67 |
| 2016/0277119 | A1 | 9/2016 | Sinsky et al. | |
| 2019/0158190 | A1 | 5/2019 | Huh et al. | |
| 2021/0208255 | A1 * | 7/2021 | Kim | G01S 7/4815 |

OTHER PUBLICATIONS

Gould et al., "Bandwidth enhancement of waveguide-coupled photodetectors with inductive gain peaking," Optics Express, Vo. 20, No. 7, Mar. 26, 2012, pp. 7101-7111.

Lischke et al., "Ultra-fast germanium photodiode with 3-dB bandwidth of 265 GHz," Nature Photonics, vol. 15, Dec. 2021, 9 pages.

Saif Islam et al., "Distributed Balanced Photodetector for RF Photonic Applications," International Journal of High Speed Electronics and Systems, vol. 10, No. 1, 2000, pp. 281-297.

Shukula et al., "Design of a CMOS Optical Receiver Front-End Using 0.18μm Technology," Wireless Engineering and Technology, Scientific Research, Published Online Jan. 2013 (http://www.scirp.org/journal/wet), 8 pages.

European Search Report for corresponding Application No. 23205101.1-1206 dated Apr. 15, 2024, 4 pages.

* cited by examiner

MULTI-PHOTODETECTOR CIRCUITS AND OPTICAL RECEIVER INCORPORATING A MULTI-PHOTODETECTOR CIRCUIT

BACKGROUND

The present disclosure relates to optical receivers and, particularly, to embodiments of a photodetector circuit and an optical receiver incorporating a photodetector circuit.

An optical receiver front end typically includes, among other components, a photodetector and a transimpedance amplifier (TIA), where an output of the photodetector is an input to the TIA. Thus, the bandwidth of the optical receiver depends on the bandwidths of both the photodetector and the TIA. Circuit modifications can be employed to improve the TIA bandwidth. Unfortunately, the photodetector bandwidth is limited by various technology parameters such as intrinsic width, diffusion constant, recombination time, etc. As a result, the overall bandwidth of an optical receiver is effectively limited by the photodetector bandwidth. Furthermore, during photodetector design, there is typically a trade-off between bandwidth improvement and performance. For example, an increase in the gain-bandwidth product of a photodetector can lead to increased delay.

SUMMARY

Disclosed herein are embodiments of a photodetector circuit. In each of the embodiments, the photodetector circuit can include an output line having an output node, a power supply line, and multiple photodiodes electrically connected in parallel between the power supply line and the output line. The photodiodes can generate an electrical output signal at the output node in response to an optical input signal.

In some embodiments, the photodetector circuit can include an output line having an output node and two power supply lines (i.e., a first power supply line and a second power supply line). In these embodiments, the photodetector circuit can include multiple photodiodes. The photodiodes can include both first photodiodes, which are electrically connected in parallel between the first power supply line and the output line, and second photodiodes, which are electrically connected in parallel between the second power supply line and the output line. Again, the photodiodes (in this case including the first and second photodiodes) generate an electrical output signal at the output node in response to an optical input signal.

Also disclosed herein are embodiments of an optical receiver that incorporates any of the disclosed multi-photodetector circuit embodiments. For example, the optical receiver can include a transimpedance amplifier and a multi-photodetector circuit. The multi-photodetector circuit can further include a power supply line, an output line with an output node connected to the transimpedance amplifier, and at least two photodiodes electrically connected in parallel between the power supply line and the output line.

BRIEF DESCRIPTION OF THE DRAWINGS

The present disclosure will be better understood from the following detailed description with reference to the drawings, which are not necessarily drawn to scale and in which.

DETAILED DESCRIPTION

As mentioned above, the overall bandwidth of an optical receiver is effectively limited by the photodetector bandwidth. Furthermore, during photodetector design, there is typically a trade-off between bandwidth improvement and performance. For example, an increase in the gain-bandwidth product of a photodetector can lead to increased delay.

Disclosed herein are embodiments of a multi-photodetector circuit (also referred to herein as a multi-photodiode circuit) configured to improve bandwidth and to improve performance (e.g., improve signal-to-noise ratio (SNR) and, in some embodiments, also reduce dark current (Idark) and, thereby jitter). In each of the embodiments, the multi-photodetector circuit can include multiple photodiodes connected in parallel to an output line. In some embodiments, all of the photodiodes can be connected, in a same direction, between a positive power supply line and the output line. All photodiodes can receive optical signals at the same power level (e.g., from an optical divider that receives an optical input signal and outputs equally divided optical signals to each photodiode). Alternatively, a series of 1:2 optical dividers can be employed so each photodiode receives a progressively lower power signal until the last two photodiodes, which receive optical signals at the same power level from the same optical divider. In other embodiments, the multi-photodetector circuit can include first photodiodes connected in a first direction between a positive power supply line and an output line and second photodiodes connected in a second direction between a negative power supply line and the output line. In these embodiments, the first photodiodes can receive equally divided optical signals from an optical divider in response to an optical input signal and the second photodiodes can similarly receive equally divided optical signals from another optical divider in response to an inverted version of the same optical input signal. In all of these embodiments, the bandwidth is increased as compared to a single photodiode and SNR is improved. Additionally, due to the balanced configuration of the latter embodiments of the multi-photodetector circuit, Idark is reduced and, thus, jitter is also reduced. Also disclosed herein are embodiments of optical receivers incorporating such multi-photodetector circuits. Such an optical receiver can, for example, be monolithically integrated (i.e., contained entirely on a single radio frequency integrated circuit (RFIC) chip).

Figure 1A:
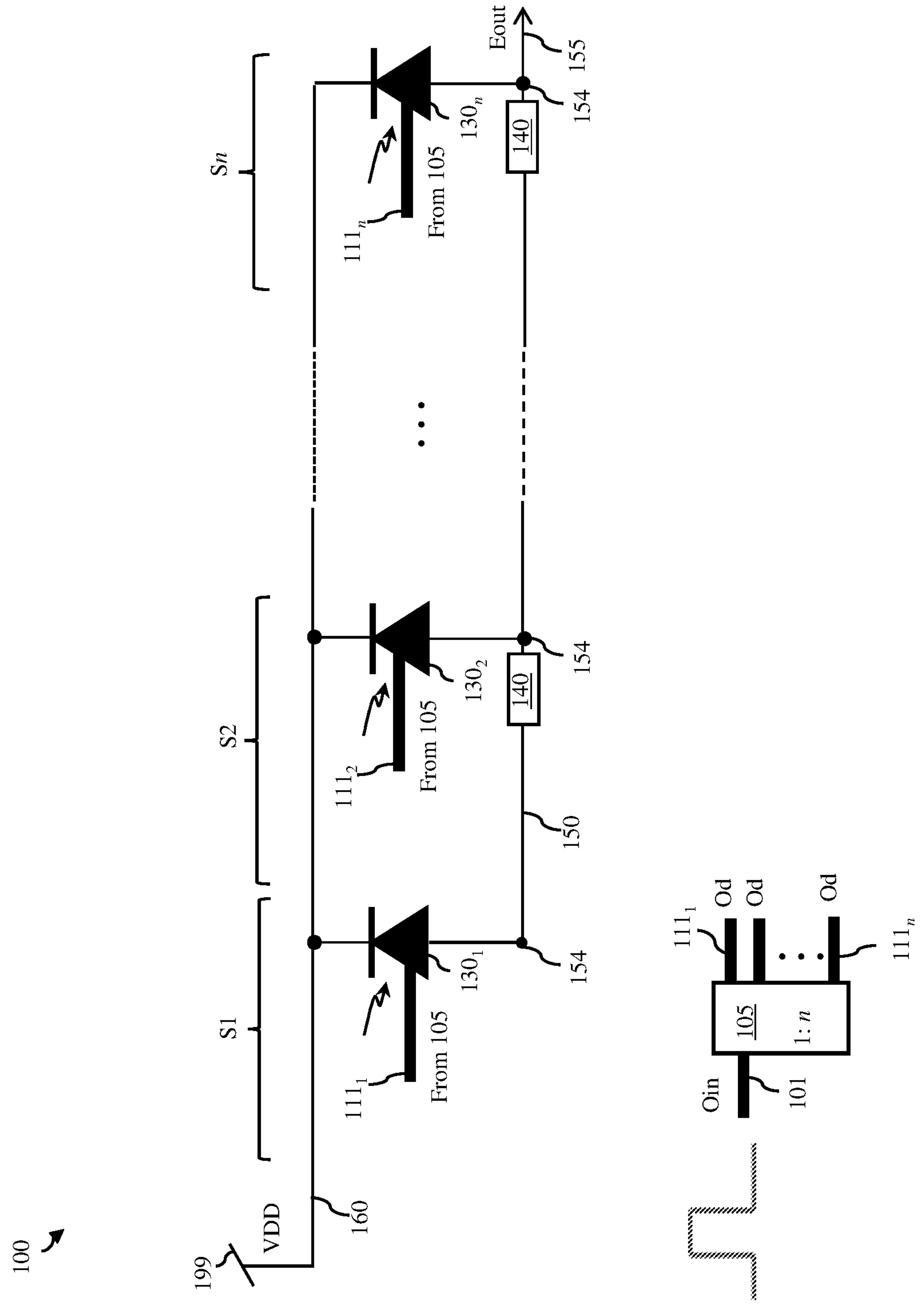
FIGS. 1A-1B are schematic diagrams illustrating alternative embodiments of a multi-photodetector circuit.
Figure 1B:
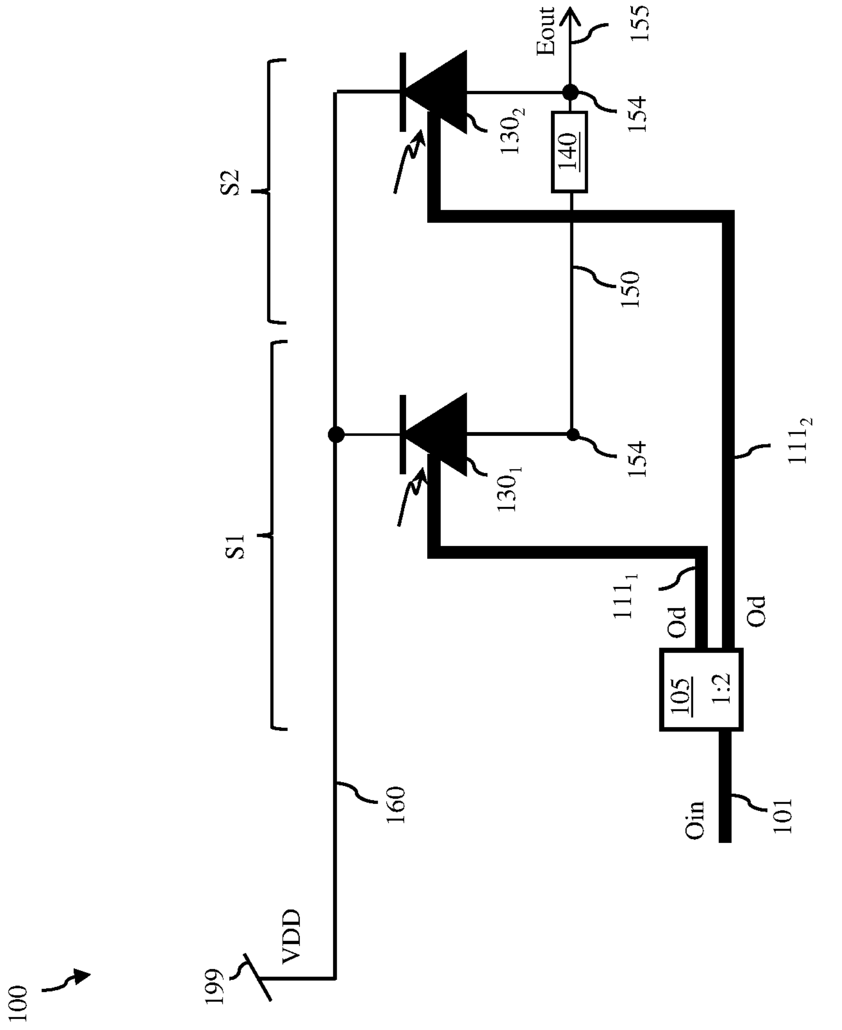

FIG. 1A is a schematic diagram illustrating, generally, a disclosed embodiment of a multi-photodetector circuit 100 (also referred to herein as a multi-photodiode circuit) with some number n of photodiodes $\mathbf{130}_1$-$\mathbf{130}_n$ and FIG. 1B is a schematic diagram illustrating, more specifically, the multi-photodetector circuit 100 with two photodiodes $\mathbf{130}_1$-$\mathbf{130}_2$.

Figure 2A:
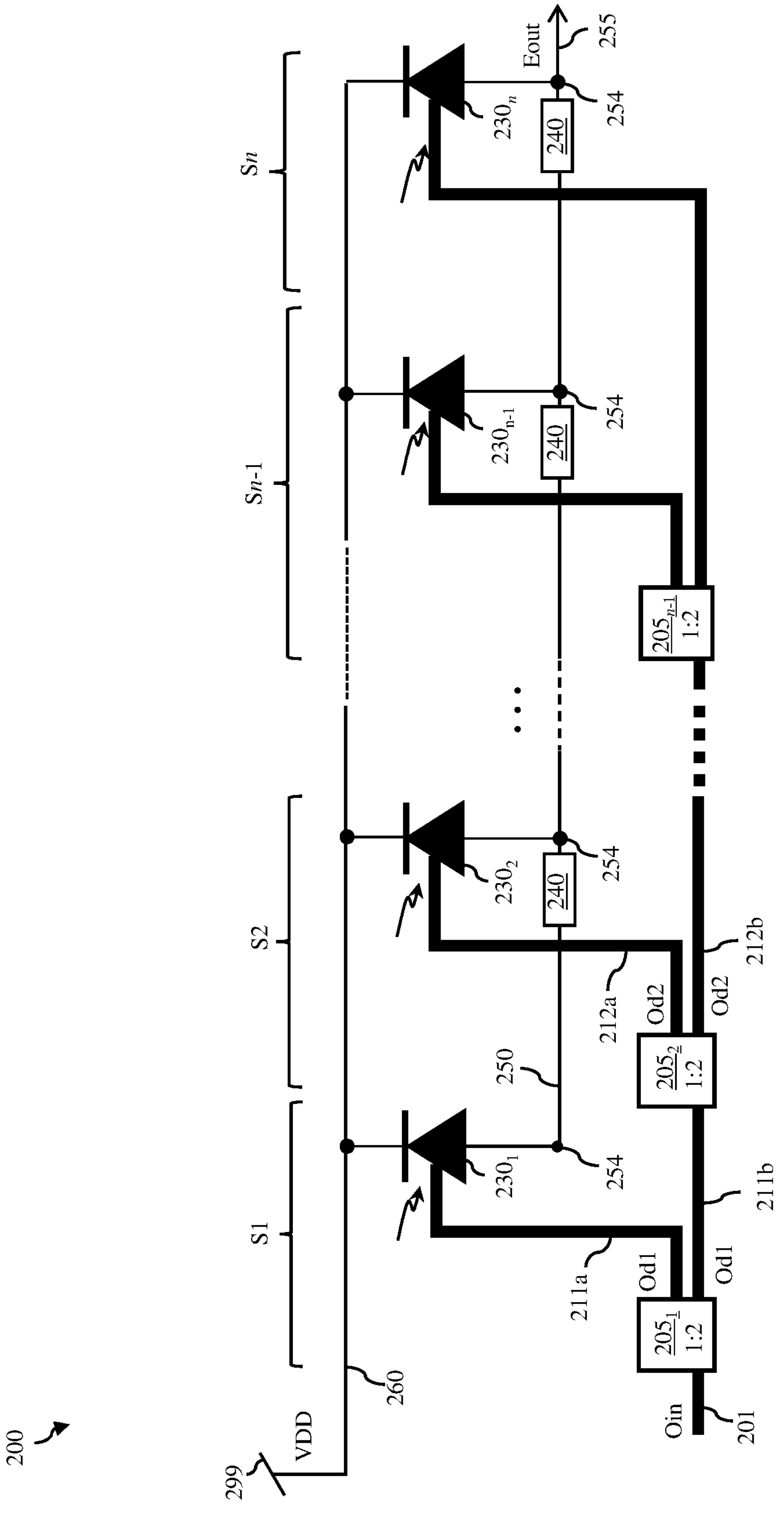
FIGS. 2A-2B are schematic diagrams illustrating alternative embodiments of another multi-photodetector circuit.
Figure 2B:
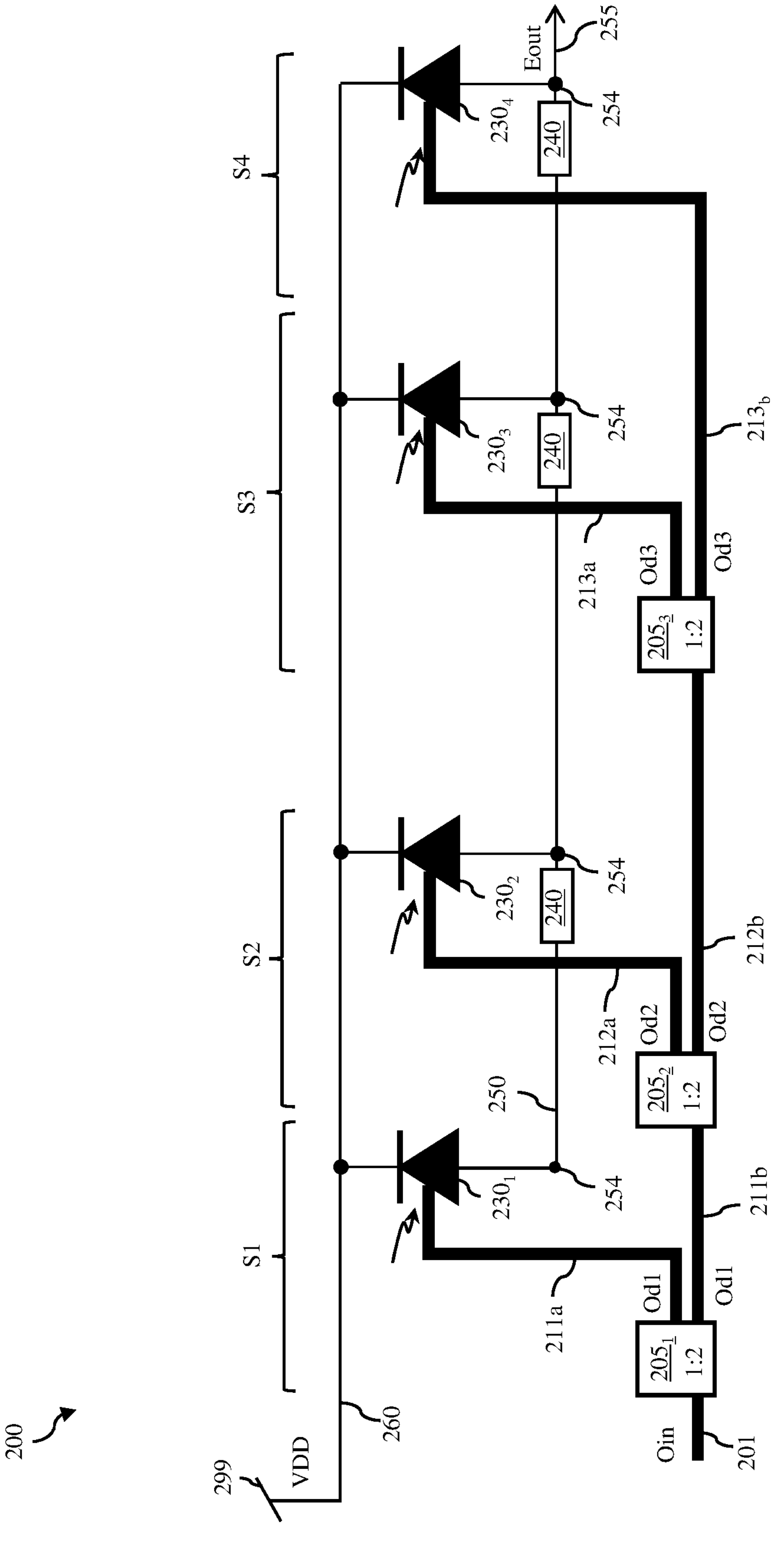
Figure 3A:
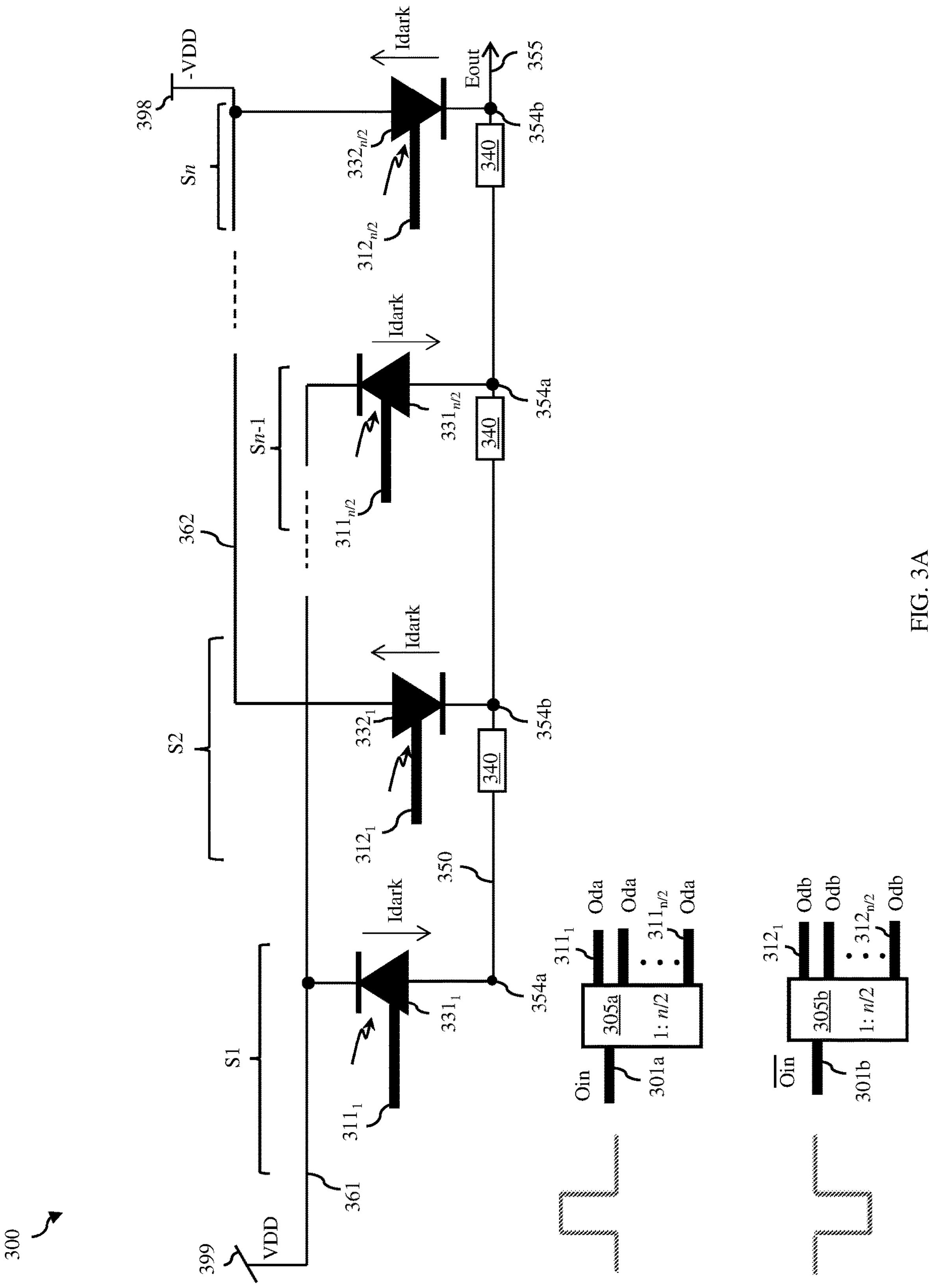
FIGS. 3A-3B are schematic diagrams illustrating alternative embodiments of a balanced multi-photodetector circuit.
Figure 3B:
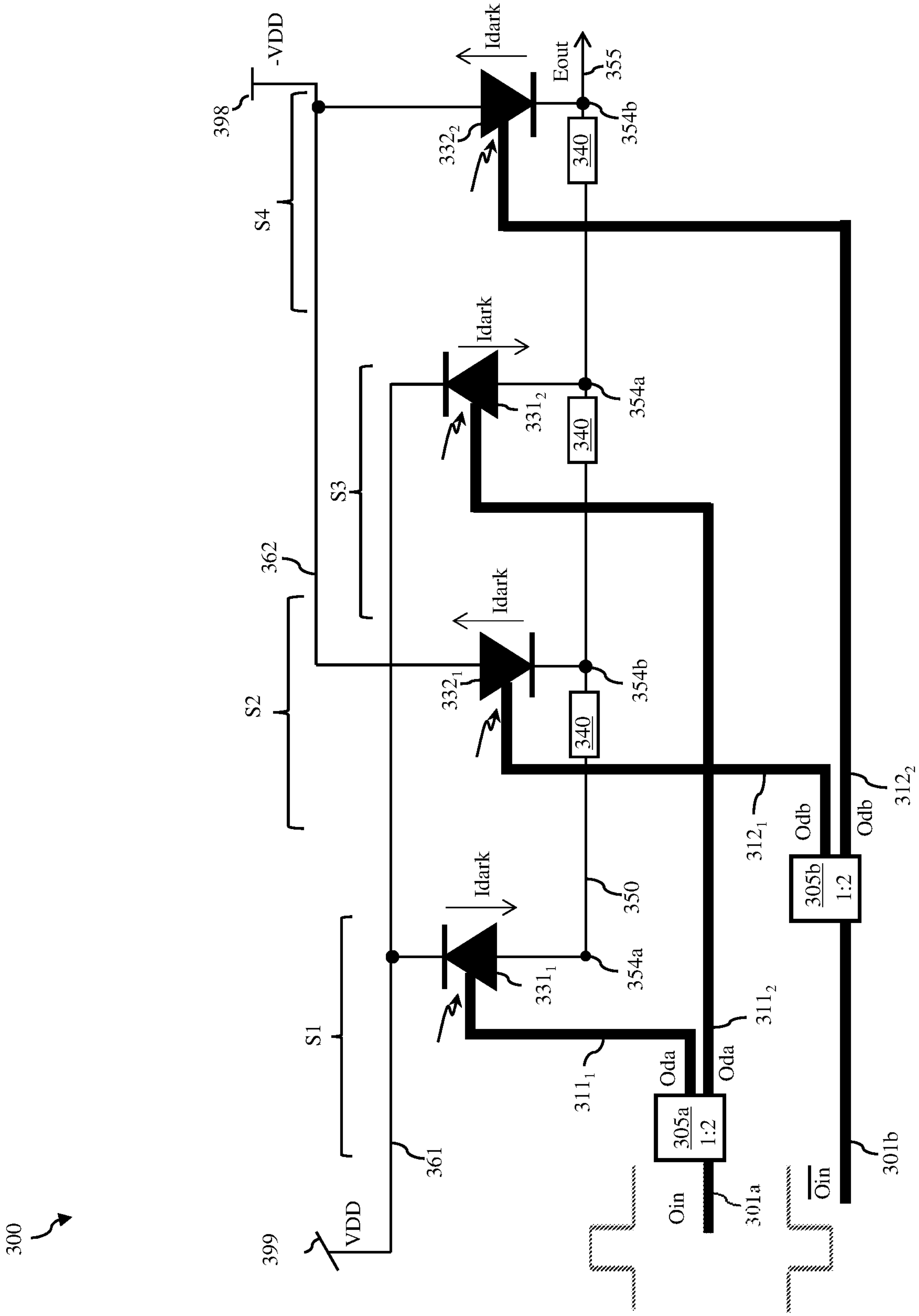

FIG. 2A is a schematic diagram illustrating, generally, another disclosed embodiment of a multi-photodetector circuit 200 (also referred to herein as a multi-photodiode circuit) with some number n of photodiodes $\mathbf{230}_1$-$\mathbf{230}_n$ and FIG. 2B is a schematic diagram illustrating, more specifically, the multi-photodetector circuit 200 with four photodiodes $\mathbf{230}_1$-$\mathbf{230}_4$. FIG. 3A is a schematic diagram illustrating, generally, a disclosed embodiment of a balanced multi-photodetector circuit 300 (also referred to herein as a balanced multi-photodiode circuit) with some specifically even number n of photodiodes including n/2 first photodiodes $\mathbf{331}_1$-$\mathbf{331}_{n/2}$ and the same number (i.e., n/2) of second photodiodes $\mathbf{332}_1$-$\mathbf{332}_{n/2}$ FIG. 3B is a schematic diagram illustrating, more specifically, the balanced multi-photodetector circuit 300 with four photodiodes $\mathbf{330}_1$-$\mathbf{330}_4$.

Referring specifically to the embodiment shown in FIGS. 1A-1B, the multi-photodetector circuit 100 can include an output line 150 having an output node 155. The multi-photodetector circuit 100 can further include a power supply line 160 and, particularly, a positive power supply line electrically connected to a positive power supply voltage rail 199 (e.g., a +V rail, such as a VDD rail) for receiving a positive power supply voltage (e.g., +V, such as VDD).

The multi-photodetector circuit 100 can further include multiple stages (S1-Sn), each including a corresponding photodiode $\mathbf{130}_1$-$\mathbf{130}_n$. The photodiodes from an initial photodiode $\mathbf{130}_1$ in an initial stage S1 to a last photodiode $\mathbf{130}_n$ in a last stage Sn can be electrically connected in parallel between the positive power supply line 160 and the output line 150. Specifically, each photodiode $\mathbf{130}_1$-$\mathbf{130}_n$ can have a cathode terminal connected to the positive power supply line 160 and an anode terminal connected to the output line 150, as illustrated.

The multi-photodetector circuit 100 can further include an optical divider 105. The optical divider 105 can be a 1: n optical divider coupled to one input waveguide 101 (i.e., a single waveguide) and n output waveguides $\mathbf{111}_1$-$\mathbf{111}_n$. This optical divider 105 can be configured to receive an optical input signal (Oin) via the input waveguide 101, to divide Oin into n equal power optical signals (Od), and to transmit the n equal power optical signals along the n output waveguides $\mathbf{111}_1$-$\mathbf{111}_n$ toward the n photodiodes $\mathbf{130}_1$-$\mathbf{130}_n$, respectively, such that the light absorbing layers of the n photodiodes $\mathbf{130}_1$-$\mathbf{130}_n$ are exposed to optical signals at the same power level. For example, in the embodiment shown in FIG. 1B, the optical divider 105 can be a 1:2 optical divider coupled to one input waveguide 101 (i.e., a single input waveguide) and two output waveguides $\mathbf{111}_1$-$\mathbf{111}_2$. This 1:2 optical divider can be configured to receive Oin via the input waveguide 101, to divide Oin into two optical signals Od having half the power of Oin, and to transmit these two equal power optical signals along the two output waveguides $\mathbf{111}_1$-$\mathbf{111}_2$ toward the photodiodes $\mathbf{130}_1$-$\mathbf{130}_2$, respectively.

The multi-photodetector circuit 100 can further include RF transmission link(s) 140 integrated into the output line 150 at each stage. For example, the anode terminals of the photodiodes $\mathbf{130}_1$-$\mathbf{130}_n$ can be connected to intermediate nodes 154 on the output line 150 and each RF transmission link 140 can connect a pair of adjacent intermediate nodes 154, respectively. Such RF transmission link(s) 140 provide stage-to-stage RF impedance matching within the multi-photodetector circuit 100.

In any case, in these embodiments, exposure of the light absorbing layers of the photodiodes $\mathbf{130}_1$-$\mathbf{130}_n$ to the optical signals 111 can trigger current flow through the photodiodes $\mathbf{130}_1$-$\mathbf{130}_n$ and output line 150. The amount of current flow through each photodiode will be proportional to the intensity of the sensed optical signal. Thus, in operation, the photodiodes $\mathbf{130}_1$-$\mathbf{130}_n$ can generate an electrical output signal (Eout) (e.g., an output current (Iout) or an output voltage (Vout)) at the output node 155 in response to Oin.

Referring specifically to the embodiment shown in FIGS. 2A-2B, the multi-photodetector circuit 200 can include an output line 250 having an output node 255. The multi-photodetector circuit 200 can further include a power supply line 260 and, particularly, a positive power supply line electrically connected to a positive power supply voltage rail 299 (e.g., a +V rail, such as a VDD rail) for receiving a positive power supply voltage (e.g., a +V, such as VDD).

The multi-photodetector circuit 200 can further include multiple stages (S1-Sn), each including a corresponding photodiode $\mathbf{230}_1$-$\mathbf{230}_n$. The photodiodes from an initial photodiode $\mathbf{230}_1$ in an initial stage S1 to a last photodiode $\mathbf{230}_n$ in a last stage Sn can be electrically connected in parallel between the positive power supply line 260 and the output line 250. Specifically, each photodiode $\mathbf{230}_1$-$\mathbf{230}_n$ can have a cathode terminal connected to the positive power supply line 260 and an anode terminal connected to the output line 250, as illustrated.

At least two of the photodiodes $\mathbf{230}_1$-$\mathbf{230}_n$ in the multi-photodetector circuit 200 can be coupled to receive optical signals with progressively decreasing levels of power, while the last two photodiodes $\mathbf{230}_n$-1 and $\mathbf{230}_n$ are coupled to receive optical signals at the same power level. Specifically, the multi-photodetector circuit 200 can include a series of multiple optical dividers. The number of optical dividers in the series can specifically be on less than the number of photodiodes. That is, if the multi-photodetector circuit 200 has n photodiodes, it will also include a series of n-1 optical dividers $\mathbf{205}_1$-$\mathbf{205}_{n-1}$. Each optical divider $\mathbf{205}_1$-$\mathbf{205}_{n-1}$ can be a 1:2 optical divider coupled to one input waveguide and two output waveguides and configured to equally divide a received optical signal and to output two equally divided optical signals. More specifically, in the series of optical dividers $\mathbf{205}_1$-$\mathbf{205}_{n-1}$, the initial optical divider $\mathbf{205}_1$ can be configured to receive an optical input signal (Oin) via an input waveguide 201, to divide Oin into two equal power optical signals (Od1), and to transmit the two equal power optical signals Od1 along waveguides 211*a* and 211*b*, respectively, toward the first photodiode $\mathbf{230}_1$ and an adjacent downstream optical divider $\mathbf{205}_2$. Each downstream optical divider can be configured to receive a previously equally divided optical signal from an adjacent upstream optical divider via one waveguide, to further divide that signal into two equal power optical signals, and to transmit the two equal power optical signals out two additional waveguides. Output waveguides from each optical divider, except for the last optical divider $\mathbf{205}_{n-1}$ in the series, will extend toward a corresponding one of the photodiodes and to an adjacent downstream optical divider, respectively; whereas the output waveguides from the last optical divider $\mathbf{205}_{n-1}$ in the series will extend toward the last two photodiodes $\mathbf{230}_{n-1}$ and $\mathbf{230}_n$, respectively.

For example, in the multi-photodetector circuit 200 of FIG. 2A, which includes four photodiodes $\mathbf{230}_1$-$\mathbf{230}_4$ and three optical dividers $\mathbf{205}_1$-$\mathbf{205}_3$, the initial optical divider $\mathbf{205}_1$ can be configured to receive Oin via an input waveguide 201, to divide Oin into two equal power optical signals (Od1), and to transmit the two equal power optical signals Od1 along waveguides 211*a* and 211*b*, respectively, toward the first photodiode $\mathbf{230}_1$ and the second optical divider $\mathbf{205}_2$ in the series. The second optical divider $\mathbf{205}_2$ can be configured to receive Od1 from the initial optical divider $\mathbf{205}_1$ via waveguide 211*b*, to further divide that signal into two equal power optical signals (Od2) and to transmit the two equal power optical signals Od2 out along waveguides 212*a* and 212*b* to the photodiode $\mathbf{230}_2$ and the third optical divider $\mathbf{205}_3$. The third optical divider $\mathbf{205}_3$ can be configured to receive Od2 from the second optical divider $\mathbf{205}_2$ via waveguide 212*b*, to further divide that signal into two equal power optical signals (Od3) and to transmit the two equal power optical signals Od3 out along waveguides 213*a* and 213*b* to the third photodiode $\mathbf{230}_3$ (the next-to-last photodiode) and the fourth photodiode $\mathbf{230}_4$ (the last photodiode), respectively.

The multi-photodetector circuit 200 can further include RF transmission link(s) 240 integrated into the output line 250 at each stage. For example, the anode terminals of the photodiodes $\mathbf{230}_1$-$\mathbf{230}_n$ can be connected to intermediate nodes 254 on the output line 250 and each RF transmission link 240 can connect a pair of adjacent intermediate nodes 254, respectively. Such RF transmission link(s) 240 provide stage-to-stage RF impedance matching within the circuit 200.

In any case, in these embodiments, exposure of the light absorbing layers of the photodiodes $\mathbf{230}_1$-$\mathbf{230}_n$ to the optical signals output from the optical dividers $\mathbf{205}_1$-$\mathbf{205}_{n-1}$ can trigger current flow through the photodiodes $\mathbf{230}_1$-$\mathbf{230}_n$ and output line 250. The amount of current flow through each photodiode will be proportional to the intensity of the sensed optical signal. Thus, in operation, the photodiodes $\mathbf{230}_1$-$\mathbf{230}_n$ can generate an Eout (e.g., Iout or Vout) at the output node 155 in response to Oin.

In the multi-photodetector circuit 100 of FIGS. 1A-1B and the multi-photodetector circuit 200 of FIGS. 2A-2B, by employing some predetermined optimal number of photodiodes, the overall bandwidth of the multi-photodetector circuit as compared to a single photodetector can be significantly increased. The optimal number of photodiodes will very as a function of the technology node. Specifically, a single photodiode will have a known bandwidth (e.g., of less than 60 GHz). A multi-photodetector circuit with multiple instances of the same photodiode will have an overall bandwidth that is dependent upon the number of photodiodes. During design, the overall bandwidth increases with each added photodiode up to some optimal number of photodiodes. For example, an exemplary multi-photodetector circuit could be designed to include an optimal number of four photodiodes that result in an increase in the bandwidth by over two times, such as by 2.6 times or approximately 150 GHs, as compared to the bandwidth of a single photodiode. It should be noted that after this optimal number of photodiodes is reached, the overall bandwidth will begin to decrease with each added photodiode. The optimal number can, for example, be readily determined through simulation.

Due to the orientation of the photodiodes $\mathbf{130}_1$-$\mathbf{130}_n$, $\mathbf{230}_1$-$\mathbf{230}_n$ in the multi-photodetector circuits 100 of FIGS. 1A-1B and 200 of FIGS. 2A-2B, dark current (Idark) will flow in the same direction through the devices into the output line 150, 250. Those skilled in the art will recognize that Idark is the result of random process variations, and it is a relatively small amount of electric current that flows through such photosensitive devices, such as photodiodes, when they are not exposed to light. Idark is a leading source of jitter in optical receivers, as discussed in greater detail below with regard to the eye diagrams of FIGS. 5-7.

Referring specifically to the embodiment shown in FIGS. 3A-3B, the balanced multi-photodetector circuit 300 is configured to reduce or even eliminate the effects of Idark. For example, this balanced multi-photodetector circuit 300 can include an output line 350 having an output node 355. The balanced multi-photodetector circuit 300 can further include a first power supply line 361 and, particularly, a positive power supply line electrically connected to a positive power supply voltage rail 399 (e.g., a +V rail, such as a VDD rail) for receiving a positive power supply voltage (e.g., +V, such as VDD). The balanced multi-photodetector circuit 300 can further include a second power supply line 362 and, particularly, a negative power supply line electrically connected to a negative power supply voltage rail 398 (e.g., −V rail) for receiving a negative power supply voltage (e.g., −V). It should be noted that the positive and negative voltage levels on the positive and negative power supply voltage rails should have the same absolute value (e.g., if +V=VDD, then −V=−VDD).

The balanced multi-photodetector circuit 300 can further include multiple stages (S1-Sn), each including a corresponding photodiode, but with alternating stages connected to different voltage rails. More specifically, the balanced multi-photodetector circuit 300 can include a number n of photodiodes. In this embodiment, n is specifically an even number (e.g., 2, 4, etc.). The photodiodes can include equal numbers (n/2) of first photodiodes $\mathbf{331}_1$-$\mathbf{331}_{n/2}$ and second photodiodes $\mathbf{332}_1$-$\mathbf{332}_{n/2}$. The first photodiodes from an initial first photodiode $\mathbf{331}_1$ to a last first photodiode $\mathbf{331}_{n/2}$ can be electrically connected in parallel between the positive power supply line 361 and the output line 350. Specifically, each first photodiode $\mathbf{331}_1$-$\mathbf{331}_{n/2}$ can have a cathode terminal connected to the positive power supply line 361 and an anode terminal connected to the output line 350, as illustrated. The second photodiodes, from an initial second photodiode $\mathbf{332}_1$ to a last second photodiode $\mathbf{332}_{n/2}$, can be electrically connected in parallel between the negative power supply line 362 and the output line 350. Specifically, each second photodiode $\mathbf{332}_1$-$\mathbf{332}_{n/2}$ can have an anode terminal connected to the negative power supply line 362 and a cathode terminal connected to the output line 350, as illustrated.

The balanced multi-photodetector circuit 300 can further include a pair of optical dividers 305*a* and 305*b*. The first optical divider 305*a* can be a 1: n/2 optical divider coupled to one input waveguide 301*a* (i.e., a single waveguide) and n/2 output waveguides $\mathbf{311}_1$-$\mathbf{331}_{n/2}$. This first optical divider 305*a* can be configured to receive an optical input signal (Oin) via the input waveguide 301*a*, to divide Oin into n/2 equal power optical signals (Oda), and to transmit the n/2 equal power optical signals along the n/2 output waveguides $\mathbf{311}_1$-$\mathbf{331}_{n/2}$ toward the n/2 first photodiodes $\mathbf{331}_1$-$\mathbf{331}_{n/2}$, respectively, such that the light absorbing layers of the n/2 first photodiodes $\mathbf{331}_1$-$\mathbf{331}_{n/2}$ are exposed to optical signals at the same power level. Similarly, the second optical divider 305*b* can be a 1: n/2 optical divider coupled to one input waveguide 301*b* (i.e., a single input waveguide) and n/2 output waveguides $\mathbf{312}_1$-$\mathbf{312}_{n/2}$. This second optical divider 305*b* can be configured to receive another optical input signal, which is inverted as compared to Oin, via the input waveguide 301*b*, to divide the inverted optical input signal into n/2 equal power optical signals (Odb), and to transmit the n/2 equal power optical signals along the n/2 output waveguides $\mathbf{312}_1$-$\mathbf{312}_{n/2}$ toward the n/2 second photodiodes $\mathbf{332}_1$-$\mathbf{332}_{n/2}$, respectively, such that the light absorbing layers of the n/2 second photodiodes $\mathbf{332}_1$-$\mathbf{332}_{n/2}$ are similarly exposed to optical signals at the same power level. For example, in the embodiment shown in FIG. 3B, the optical divider 305*b* can be a 1:2 optical divider coupled to one input waveguide 301*a* (i.e., a single input waveguide) and two output waveguides $\mathbf{311}_1$-$\mathbf{311}_2$. This 1:2 optical divider can be configured to receive Oin via the input waveguide 301*a*, to divide Oin into two optical signals Oda having half the power of Oin, and to transmit these two equal power optical signals along the two output waveguides 311$_1$-311$_2$ toward the first photodiodes 331$_1$-331$_2$, respectively. The optical divider 305*b* can similarly be a 1:2 optical divider coupled to a one input waveguide 301*b* (i.e., a single input waveguide) and two output waveguides 312$_1$-312$_2$. This 1:2 optical divider can be configured to receive the inverted optical input signal via the input waveguide 301*b*, to divide it into two optical signals Odb having half the power of the inverted optical input signal, and to transmit these two equal power optical signals along the two output waveguides 312$_1$-312$_2$ toward the first photodiodes 331$_1$-331$_2$, respectively.

The balanced multi-photodetector circuit 300 can further include RF transmission links 340 integrated into the output line 350 at each stage. For example, the anode terminals of the first photodiodes 331$_1$-331$_{n/2}$ can be connected to first intermediate nodes 354*a* on the output line 350. The cathode terminals of the second photodiodes 332$_1$-332$_{n/2}$ can be connected to second intermediate nodes 354*b* on the output line 350. The first and second intermediate nodes 354*a*-354*b* alternate along the output line 350 and each RF transmission link 340 can connect a pair of adjacent first and second intermediate nodes 354*a*-354*b*, respectively. Such RF transmission links 340 provide stage-to-stage RF impedance matching within the circuit 300.

In any case, in these embodiments, exposure of the light absorbing layers of the photodiodes 330$_1$-330$_n$ to the optical signals from the first and second optical dividers 305*a* or 305*b* can trigger current flow through the first photodiodes 331$_1$-331$_{n/2}$, the second photodiodes 332$_1$-332$_{n/2}$, and output line 350. As discussed above with regard to the previous embodiments, the amount of current flow through each photodiode will be proportional to the intensity of the sensed optical signal. Thus, in operation, Eout (e.g., an output current (Iout) or an output voltage (Vout)) will be generated at the output node 355 in response to Oin.

As in the multi-photodetector circuits 100 or 200 described above, in the balanced multi-photodetector circuit 300 of FIGS. 3A-3B by employing some predetermined optimal number of photodiodes, the overall bandwidth of the multi-photodetector circuit as compared to a single photodetector can be significantly increased. Again, the optimal number of photodiodes will very as a function of the technology node. Specifically, a single photodiode will have a known bandwidth (e.g., of less than 60 GHz). A balanced multi-photodetector circuit with multiple instances of the same photodetector will have an overall bandwidth that depends on the number of photodiodes. During design, the overall bandwidth can be increased with each pair of added photodiodes up to some optimal even number of photodiodes. For example, an exemplary balanced multi-photodetector circuit could be designed to include an optimal number of four photodiodes that result in an increase in the bandwidth by over two times, such as by 2.2 times or approximately 125 GHs, as compared to the bandwidth of a single photodiode. It should be noted that after this optimal number of photodiodes is reached, the overall bandwidth will begin to decrease with each added photodiode. The optimal number can, for example, be readily determined through simulation.

Additionally, due to the opposite orientations of the first photodiodes 331$_1$-331$_{n/2}$ and second photodiodes 332$_1$-332$_{n/2}$, due to their connections to positive and negative power supply voltage rails, respectively, and further due to the fact that the optical signals received by the second photodiodes 331$_1$-332$_{n/2}$ are generated based on an inverted optical signal as compared to the optical signals received by the first photodiodes 331$_1$-331$_{n/2}$, Idark through each photodiode will be essentially the same but Idark through each first photodiode 331$_1$-331$_{n/2}$ will flow in one direction toward the output line 350, whereas Idark through each through each second photodiode 332$_1$-332$_{n/2}$ will flow the opposite direction away from the output line 350. As result of equal amounts of Idark flowing in opposite directions, all Idark is effectively cancelled out along the output line 350, thereby minimizing jitter that would otherwise result, as discussed in greater detail below with regard to the eye diagrams of FIGS. 5-7.

It should be noted that in each of the multi-photodetector circuits 100, 200, 300 illustrated in FIGS. 1A-1B, 2A-2B, and 3A-3B, respectively, the photodiodes 130$_1$-130$_n$, 230$_1$-230$_n$, 331$_1$-331$_{n/2}$ and 332$_1$-332$_{n/2}$ can all be manufacture according to a same design so as to be essentially identical in structure and, thereby have the same specifications (e.g., operate at same wavelengths, have same sensitivity, same junction capacitance, same leakage current, etc.). For example, such photodiodes can include a light absorbing layer of germanium (Ge), silicon germanium (SiGe), or some other suitable light absorbing material and they can be configured as a PN photodiode, a PIN photodiode, or avalanche photodiode. Such photodiodes are well known in the art and, thus, the details thereof have been omitted from this specification in order to allow the reader to focus on the salient aspects of the disclosed embodiments.

Additionally, in each of the multi-photodetector circuits 100, 200, 300 illustrated in FIGS. 1A-1B, 2A-2B, and 3A-3B, respectively, the optical divider(s) 105, 205$_1$-205$_{n-1}$, and 305*a*-305*b* can be any suitable optical divider (also referred to herein as an optical power splitter) configured to equally divide an incoming optical signal into some specific number of outgoing optical signals at equal power levels. For example, in some embodiments, the optical divider(s) can be multi-mode interferometer(s) (MMIs). As mentioned above, the number of outgoing signals from each optical divider is embodiment dependent. For example, in the multi-photodetector circuit 100 of FIGS. 1A-1B, the optical divider 105 should be configured to divide Oin into n different outgoing optical signals, where n is also equal to the number of photodiodes 130$_1$-130$_n$. In the multi-photodetector circuit 200 of FIGS. 2A-2B, each optical divider 205$_1$-205$_{n-1}$ is a 1:2 optical divider. In the balanced multi-photodetector circuit 300 of FIGS. 3A-3B, the optical divider 305*a*-305*b* should be configured to divide Oin into n/2 different outgoing optical signals, where n is equal to the number of photodiodes 330$_1$-330$_n$ and where n/2 is the number of first photodiodes and the same number of second photodiodes. Examples of optical dividers that could be employed within each multi-photodetector circuit 100, 200, 300 can include, but are not limited to, multimode interferometer (MMI) based optical power splitters, evanescent coupling-based optical power splitters, or photonic crystal-based optical power splitters. These different types of optical power splitters are known in the art and, thus, the details thereof have been omitted from the specification in order to allow the reader to focus on the salient aspects of the disclosed embodiments.

Figure 4:
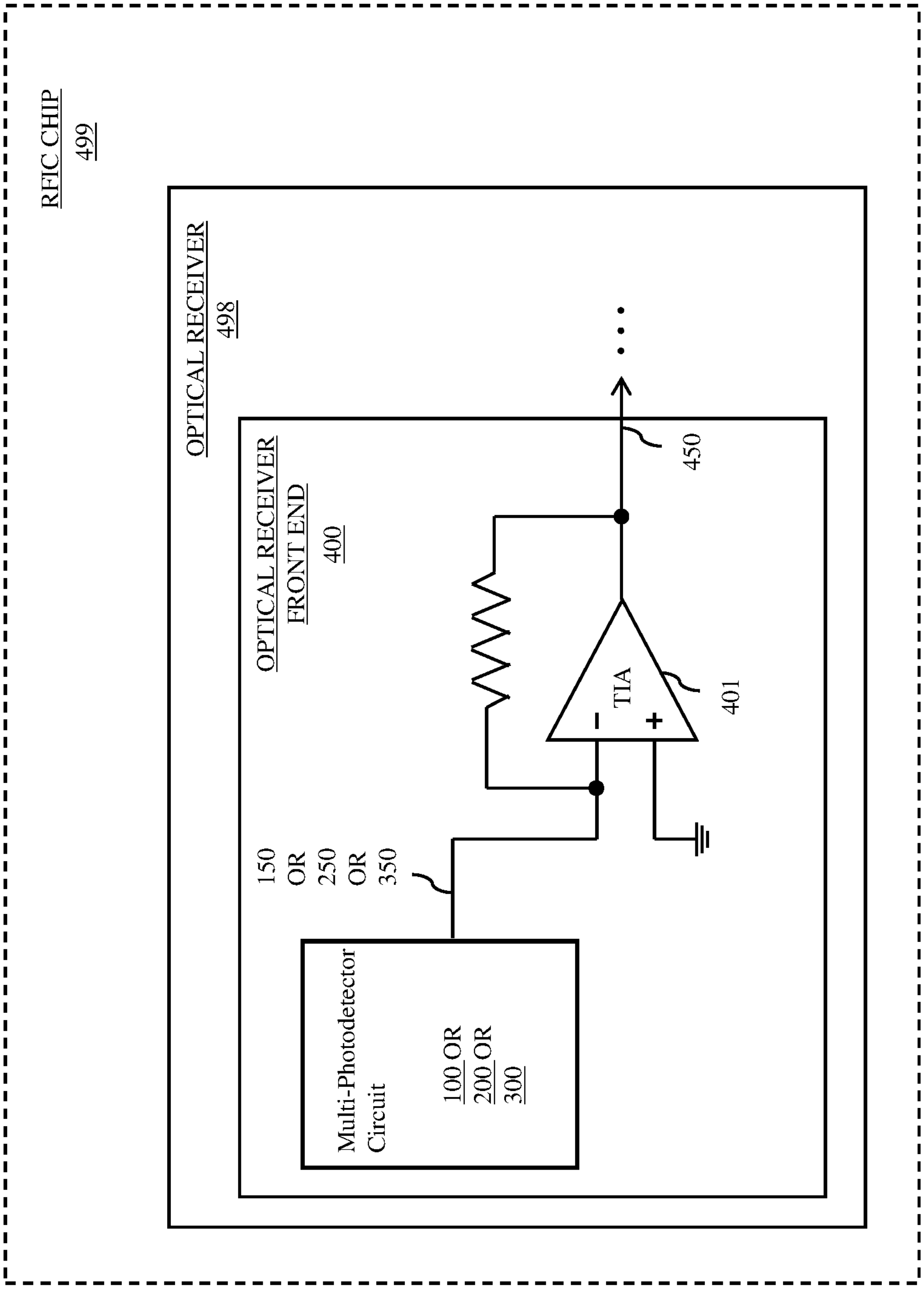
FIG. 4 is a schematic diagram illustrating embodiments of an optical receiver front end incorporating any of the disclosed multi-photodetector circuits embodiments of FIGS. 1A-3B, an optical receiver incorporating the optical receiver front end, and a radio frequency integrated circuit (RFIC) chip incorporating the optical receiver.

FIG. 4 is a schematic diagram illustrating disclosed embodiments of an optical receiver front end 400 and an optical receiver 498 incorporating the optical receiver front end 400, The optical receiver front end 400 can include a transimpedance amplifier (TIA) 401 and, instead of a single photodetector, any one of the above-described multi-photodetector circuits 100 of FIGS. 1A-1B, 200 of FIG. 2A-2B or 300 of FIGS. 3A-3B. Those skilled in the art will recognize that a TIA is a current-to-voltage converter. In this optical receiver front end 400, the TIA 401 can have a pair of inputs including a non-inverting input connected to ground and an inverting input connected to the output node 155, 255 or 355 of the multi-photodetector circuit 100, 200 or 300, respectively. The TIA 401 can further have an output 450 can be configured to amplify Iout from the multi-photodetector circuit 100, 200 or 300 and to convert it into an output voltage (Vout) generated at the output 450. The optical receiver front end 400 can be incorporated into an optical receiver 498. Various optical receiver stages (e.g., linear channel, data recovery, etc.) are well known in the art and are omitted from the specification and drawings in order to allow the reader to focus on the salient aspects of the disclosed embodiments. As further illustrated in FIG. 4, the optical receiver 498 can, optionally, be a monolithically integrated optical receiver. That is, the optical receiver 498 can be contained entirely on a single radio frequency integrated circuit (RFIC) chip 499.

Figure 5:
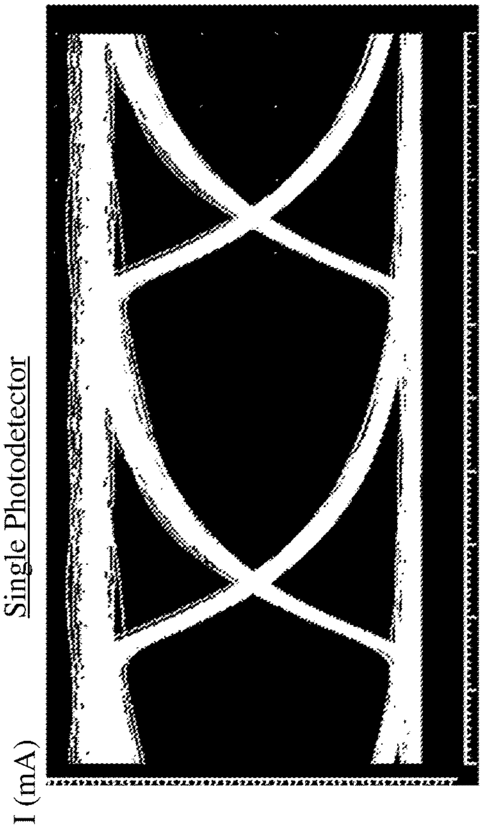
FIG. 5 is illustrative of an eye diagram generated from the output signal of a single photodiode.
Figure 6:
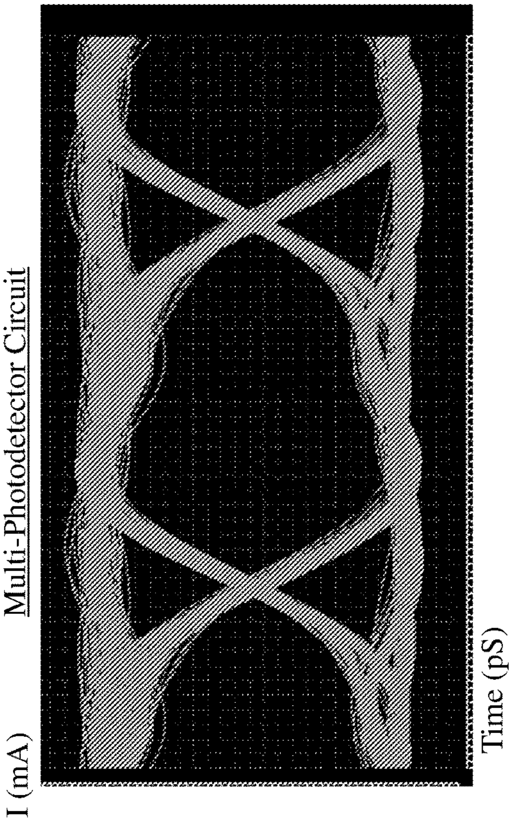
FIG. 6 is illustrative of an eye diagram generated from the output signal of a multi-photodetector circuit.
Figure 7:
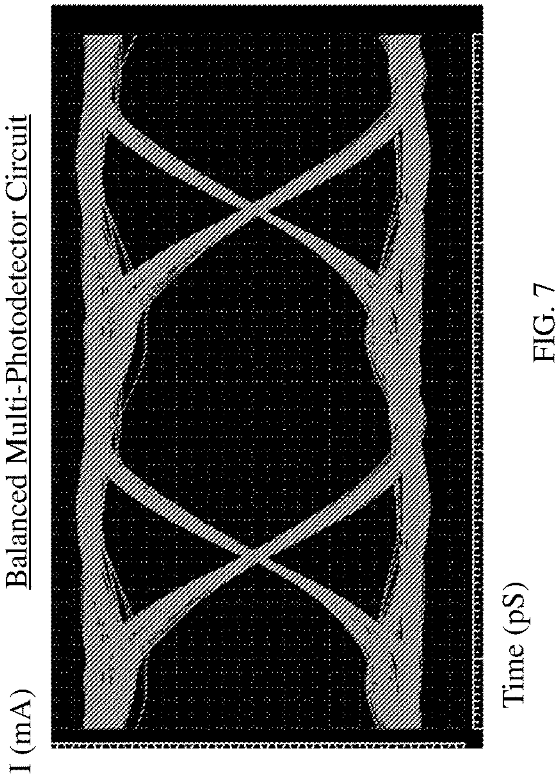
FIG. 7 is illustrative of an eye diagram generated from the output signal of a balanced multi-photodetector circuit.

FIG. 5 is illustrative of an eye diagram generated from the output signal of a single photodiode (e.g., connected to the non-inverting input of a TIA in an optical receiver). FIG. 6 is illustrative of an eye diagram generated from the output signal of an unbalanced multi-photodetector circuit, such as the multi-photodetector circuit 100 of FIGS. 1A-1B or the multi-photodetector circuit 200 of FIGS. 2A-2B (e.g., connected to the non-inverting input of a TIA in an optical receiver). FIG. 7 is illustrative of an eye diagram generated from the output signal of a balanced multi-photodetector circuit, such as the balanced multi-photodetector circuit 300 of FIGS. 3A-3B (e.g., connected to the non-inverting input of a TIA in an optical receiver). Those skilled in the art will recognize that an eye diagram refers to an oscilloscope display in which an output signal from device or circuit is repeatedly sampled and applied to the vertical input, while the data rate is used to trigger the horizontal sweep. In eye patterns, high SNR is indicated by a relatively closed eye shape and jitter is indicated by the rising and falling edges that are offset (i.e., not tightly aligned). Thus, as illustrated, the eye diagram of FIG. 5 indicates that in such use of a single photodetector leads to both a high SNR and high jitter. As illustrated in the eye diagram of FIG. 6, use of the multi-photodetector circuit 100 or 200 not only results in an increase in bandwidth (as discussed above) but also a reduction in SNR. Additionally, as illustrated in the eye diagram of FIG. 7, use of the balanced multi-photodetector circuit 300 not only results in an increase in bandwidth (as discussed above) but also a reduction in both SNR and jitter (which is due to the balancing out of Idark).

It should be understood that in the structures and method described above, a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

It should be understood that the terminology used herein is for the purpose of describing the disclosed structures and methods and is not intended to be limiting. For example, as used herein, the singular forms "a," "an" and "the" are intended to include the plural forms as well, unless the context clearly indicates otherwise. Additionally, as used herein, the terms "comprises," "comprising," "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit comprising:

a single input node coupled to receive an optical input signal from a single input waveguide;

an output line having an output node;

a power supply line;

photodiodes electrically connected in parallel between the power supply line and the output line, wherein the photodiodes include at least an initial photodiode, a next-to-last photodiode, and a last photodiode; and a series of optical dividers coupled between the single input node and the photodiodes and including at least an initial optical divider and a last optical divider, wherein a number of the optical dividers in the series is one less than a number of the photodiodes, and wherein the photodiodes generate an electrical output signal at the output node in response to the optical input signal.

2. The circuit of claim 1, wherein the power supply line is connected to receive a positive power supply voltage, wherein the photodiodes have cathode terminals connected to the power supply line and anode terminals connected to intermediate nodes, respectively, on the output line, and wherein the circuit further includes:

one optical divider coupled to receive the optical input signal and to output equally divided optical signals to the photodiodes, respectively; and at least one transmission link in the output line, wherein each transmission link is connected between two adjacent intermediate nodes.

3. The circuit of claim 1, wherein the photodiodes have a same design.

4. The circuit of claim 1, wherein the initial optical divider is coupled to receive the optical input signal and to output two initial equally divided optical signals to the initial photodiode and to an adjacent downstream optical divider in the series, wherein each downstream optical divider in the series is coupled to receive a divided optical signal from an adjacent upstream optical divider in the series and to output two further equally divided output signals, and wherein the last optical divider in the series outputs two final equally divided optical signals to the next-to-last photodiode and the last photodiode, respectively.

5. The circuit of claim 1, wherein the power supply line is connected to receive a positive power supply voltage, wherein the photodiodes have cathode terminals connected to the power supply line and anode terminals connected to intermediate nodes, respectively, on the output line, and wherein the circuit further includes transmission links in the output line connected between each pair of adjacent intermediate nodes.

6. The circuit of claim 1, wherein the photodiodes include at least four photodiodes.

7. The circuit of claim 1, wherein the optical dividers include multi-mode interferometers.

8. An optical receiver comprising:

a transimpedance amplifier; and a multi-photodetector circuit including a single input node coupled to receive an optical input signal from a single input waveguide, at least one power supply line, an output line, photodiodes electrically connected in parallel between the power supply line and the output line, and a series of optical dividers coupled between the single input node and the photodiodes, wherein the photodiodes include at least an initial photodiode, a next-to-last photodiode, and a last photodiode, wherein the series of optical dividers include at least an initial optical divider and a last optical divider, wherein a number of the optical dividers in the series is one less than a number of the photodiodes, wherein the photodiodes generate an electrical output signal at the output node in response to the optical input signal, and wherein the output line has an output node connected to the transimpedance amplifier.

9. The optical receiver of claim 8, wherein the power supply line is a positive power supply line, all the photodiodes have cathode terminals connected to the positive power supply line and anode terminals connected to the output line.

10. The optical receiver of claim 8, wherein the optical receiver is a monolithically integrated optical receiver on a radio frequency integrated circuit chip.

11. A circuit comprising:

an output line having an output node;

a power supply line; and photodiodes electrically connected in parallel between the power supply line and the output line, wherein the photodiodes generate an electrical output signal at the output node in response to an optical input signal, wherein the photodiodes include at least an initial photodiode, a next-to-last photodiode, and a last photodiode, wherein the circuit further includes a series of optical dividers including at least an initial optical divider and a last optical divider, and wherein a number of the optical dividers in the series is one less than a number of the photodiodes.

12. The circuit of claim 11, wherein the photodiodes have a same design.

13. The circuit of claim 11, wherein the initial optical divider is coupled to receive the optical input signal and to output two initial equally divided optical signals to the initial photodiode and to an adjacent downstream optical divider in the series, wherein each downstream optical divider in the series is coupled to receive a divided optical signal from an adjacent upstream optical divider in the series and to output two further equally divided output signals, and wherein the last optical divider in the series outputs two final equally divided optical signals to the next-to-last photodiode and the last photodiode, respectively.

14. The circuit of claim 11, wherein the power supply line is connected to receive a positive power supply voltage, wherein the photodiodes have cathode terminals connected to the power supply line and anode terminals connected to intermediate nodes, respectively, on the output line, and wherein the circuit further includes transmission links in the output line connected between each pair of adjacent intermediate nodes.

15. The circuit of claim 11, wherein the photodiodes include at least four photodiodes.

16. The circuit of claim 11, wherein the optical dividers include multi-mode interferometers.

* * * * *